(12) United States Patent
Barton

(10) Patent No.: US 6,805,469 B1
(45) Date of Patent: Oct. 19, 2004

(54) CONCEALED SAFETY LIGHTING DEVICE

(76) Inventor: R A Barton, 56 Barbara Jean St., Grafton, MA (US) 01519

( * ) Notice: Subject to any disclaimer, the term of this patent is extended or adjusted under 35 U.S.C. 154(b) by 0 days.

(21) Appl. No.: 10/249,723

(22) Filed: May 3, 2003

(51) Int. Cl.$^7$ .............................................. F21V 15/00
(52) U.S. Cl. ........................ 362/365; 362/95; 362/364; 362/368; 362/370; 362/802
(58) Field of Search ............................. 362/20, 23, 28, 362/29, 34, 84, 85, 95, 145, 147, 157, 183, 190, 191, 362, 364, 365, 368, 370, 802

(56) References Cited

U.S. PATENT DOCUMENTS

| | | | |
|---|---|---|---|
| 3,739,226 A | * 6/1973 | Seiter et al. .................. 362/20 |
| 4,343,032 A | * 8/1982 | Schwartz ..................... 362/147 |
| 4,514,789 A | * 4/1985 | Jester ........................... 362/95 |
| 4,631,649 A | 12/1986 | McCue et al. ............... 362/183 |
| 5,473,517 A | * 12/1995 | Blackman ..................... 362/95 |
| 5,713,655 A | * 2/1998 | Blackman ..................... 362/95 |
| 5,833,350 A | * 11/1998 | Moreland ..................... 362/95 |
| 6,000,807 A | * 12/1999 | Moreland ..................... 362/95 |
| 6,010,228 A | * 1/2000 | Blackman et al. ............ 362/95 |

* cited by examiner

*Primary Examiner*—Thomas M. Sember
*Assistant Examiner*—Ismael Negron

(57) ABSTRACT

A concealed safety light is described where the light source is integrated and mounted into a switch or power outlet wiring device. The light source is controlled by a circuit that detects ambient light and turns on the light source in the event of a power failure when it is dark. The resulting safety light is concealed in a standard wiring junction box and trimmed with conventional wall cover plate.

17 Claims, 4 Drawing Sheets

CONCEALED SAFETY LIGHTING DEVICE

BACKGROUND OF INVENTION

1. Field of Invention

The present invention relates generally to alternate safety lighting devices and, more specifically, to an alternate safety lighting device that is combined with standard wall switches and power outlets such that they are unobtrusive and nearly indistinguishable from standard electrical wiring devices.

Emergency lighting devices are typically installed in such obvious ways that they interfere with visible design and decor of a living space or workspace. This often affects a person's decision whether or not to install them. By making the emergency lighting device inconspicuous, more installations and thus safer homes and workplaces will result.

Some amount of light is necessary during a night time power failure to allow people to move about safely. The reduction in size of high output light sources that consume small amounts of power, make integrating them into common devices possible without substantially altering the form and function of the original device. Sufficient light from these light emitting devices such as Light Emitting Diodes or Laser diodes allow people to see objects and pathways that might otherwise not be visible in the sudden darkness of a night time power failure.

Candles are often used during power failures that occur in the nighttime hours of darkness. The use of candles presents a fire safety risk and the present invention provides a safe alternative method of lighting an area to provide safe movement during such power failures. The present invention minimizes or eliminates the need for using candles during power blackouts.

2. Description of Prior Art

Similar prior art backup lighting devices that illuminate when a power failure occurs are often embodied in the form of a wall cover plate to surround an existing switch or AC outlet. Their embodiments are designed to mechanically and electrically attach to the switch or AC outlet either by direct attached wiring, plugs, or wireless means. Prior art devices do not disclose an apparatus concealed within a direct replacement for a common wall switch device or an AC outlet device. They also do not perceive or address the problem of being conspicuous, thus limiting the locations where one would install such devices. The present invention looks like and performs the function of the common wall switch or AC power outlet, installs into the standard electrical workboxes, and simultaneously provides the function of the safety light, thereby replacing the common wall switch or AC outlet entirely. It is concealed upon the installation of a standard wall cover plate over it and overcomes the problem of being conspicuous.

In U.S. Pat. No. 3,739,226 Seiter describes an emergency light for mounting to an electrical wall socket. The apparatus for emergency lighting plugs into an AC wall outlet. It is easily visible and conspicuous in its display and mounting mechanism.

In U.S. Pat. No. 4,514,789 Jester describes an illuminated light switch plate with LED and oscillator circuit to replace a wall cover plate. It is intended to locate the wall switch in the dark. It is a cover plate that has no power failure detection or backup lighting mechanism.

In U.S. Pat. Nos. 5,473,517, 5,713,655, and 6,010,228 Blackman describes a housing with an emergency safety lighting apparatus that replaces the wall cover plate and mechanically attaches to the wall switch device using the same screw mounting holes used by the former wall cover plate. It does not perform the function of the switch itself. It is large, plainly visible and protrudes from the wall as a result of its size, shape and the bulk of its housing.

In U.S. Pat. No. 5,833,350 and 6,000,807 Moreland describes a switch cover plate that houses the apparatus for emergency. In U.S. Pat. No. 4,631,649 McCue describes a plug-in emergency light fixture that plugs into a wall receptacle and is semi-permanently mounted by screwing it to the receptacle. None of these are part of the receptacle and they do not remain concealed or inconspicuous during the times when AC power is available.

Prior art generally discloses backup lighting devices that either plug into a power outlet or replace the cover plate that surrounds common AC wall switches and outlets. They do not disclose a concealed device that completely replaces the common wall switch or AC power outlet devices as in the present invention. The present invention occupies the same physical space, appears as and provides the function of a conventional switch or AC outlet, while simultaneously providing automatic illumination to an area when a power failure occurs resulting in a concealed safety lighting device.

The object of the present invention is to conceal the safety light source within the same physical housing used by a common switch or AC power outlet, thereby allowing the safety lighting device to be installed in very many locations inconspicuously. The device is installed in place of a conventional switch or outlet and provides emergency backup lighting with minimal visible impact on the design or decor of the area adjacent to the installed device.

SUMMARY OF INVENTION

The concealed safety lighting device is comprised of an electrical switch or power outlet, a detection mechanism connected to a primary power source for detecting the presence or lack of presence of the AC voltage, an alternate power source and a safety light source connected between the detection mechanism and the alternate power source. The detection mechanism monitors the availability of AC voltage and causes the safety light to illuminate upon detection of an interruption of the voltage at the terminals of the power source. The apparatus is capable of delivering sufficient illumination of the area adjacent to the installed device to allow safe movement and other activities in the area for periods of approximately 24 hours or more depending on the alternate power source selection The battery supplying power to the alternate safety light device may be rechargeable batteries where power failures are more frequent or non-rechargeable batteries where power failures may be infrequent, by implementing a simple change to the DC power circuitry. An integrated battery status indicator is optional. An integrated sensor adjusts the intensity of the safety light according to ambient lighting conditions thereby extending the battery life.

A primary object of the present invention is to provide an apparatus that is neither visible nor recognizable primarily as a device for providing alternate safety lighting and has little or no visible impact on interior space designs, thus overcoming the shortcomings of prior art devices.

Another object of the present invention is to provide an apparatus for providing alternate safety lighting for an extended period of time, while remaining smaller than most prior art.

Another object of the present invention is to provide an apparatus for providing alternate safety lighting that is able to detect the occurrence of a power failure.

An additional object of the present invention is to provide an apparatus for providing alternate safety lighting that is able to provide visibility from the concealed illumination device upon detection of a power failure, thereby allowing safe passage and mobility by persons in the nearby adjacent area.

A further object of the present invention is to provide an apparatus for providing alternate safety lighting including an indicator to warn the user of a low battery condition that would limit or prevent the device from illuminating during a power interruption due to a drained alternate power source.

A yet further object of the present invention is to provide an apparatus for providing alternate safety lighting to multiple unlit areas during power failures by installing in many locations throughout a house or building equipped with AC power in an inconspicuous manner.

A further object of the present invention is to provide a concealed safety lighting device that includes an ambient light detection mechanism for reducing the intensity of the emergency light when other light sources such as daylight are available to extend the life of the alternate power source during extended power outages.

A still further object of the present invention is to provide a concealed safety lighting device that includes an optional on/off switch for selectively turning the emergency light off during a power outage to conserve battery life if lighting is not needed in that area for a specific period of time.

Another object of the present invention is to provide a concealed safety lighting device that is activated and available for use with no specific action to be taken by the user.

A still further object of the present invention is to provide a concealed safety lighting device that is economical in cost to manufacture resulting in end user costs that imply affordability allowing for immediate commercial use.

An additional object of the present invention is to be easy to install with no additional knowledge necessary than that needed to install or replace common AC power outlets or switch devices.

Numerous devices for providing alternate safety lighting have been provided in the prior art. For example, U.S. Pat. Nos. 4,631,649, 5,473,517 and 5,833,350 all are illustrative of such prior art. While these units may be suitable for the particular purpose to which they address, they would not be as suitable for the purposes of the present invention as heretofore described.

Additional objects of the present invention will appear as the description proceeds. A concealed safety lighting device providing illumination of an area upon detection of the failure of the power source is disclosed by the present invention The light source is completely embodied in standard AC switches and power outlets. The concealed safety lighting device includes a power outlet or a switch, a detection circuit connected to the primary power source for detecting a voltage at terminals of the primary power source, an alternate power source and safety light source connected between the detection circuit and the alternate power source.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF DRAWINGS

Various other objects, features and attendant advantages of the present invention will become more fully appreciated as the same becomes better understood when considered in conjunction with the accompanying drawings, in which like reference characters designate the same or similar parts throughout the several views.

FIG. 3 is a cutaway view of the AC switch embodiment showing the integration of the standard switch and the emergency power failure backup lighting device components, the AC power outlet variation being substantially similar.

DESCRIPTION OF THE REFERENCED NUMERALS

Figure 1A:
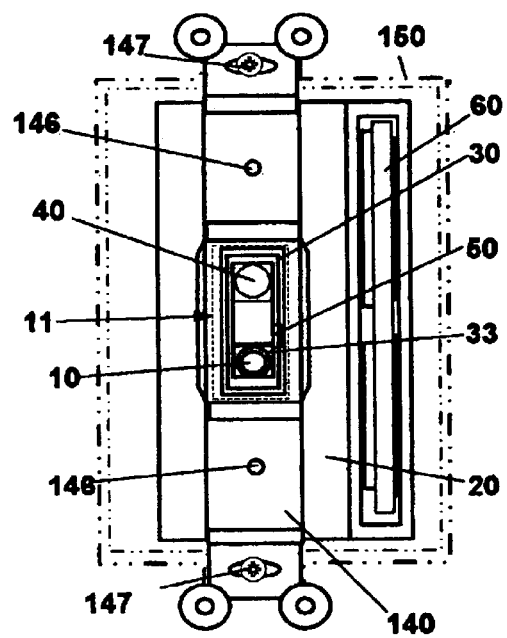
FIG. 1A is a front view and FIG. 1B is a side view of the apparatus in the form of an AC switch for providing concealed safety lighting of the present invention, indicating the placement of high intensity light source in an inconspicuous manner.

Turning now descriptively to the drawings, in which similar reference characters denote similar elements throughout the several views, the Figures illustrate the concealed safety lighting device in different embodiments of the present invention. With regard to the reference numerals used, the following numbering is used throughout the various drawing figures.

10, 10'. Safety light source.
11. Normally exposed area of the switch visible after cover plate is installed.
12. Normally exposed area of the outlet visible after cover plate is installed.
20. Switch device housing containing switch mechanism and safety lighting apparatus
21. Outlet device housing containing duplex power outlet mechanism and safety lighting apparatus.
30, Clear or translucent body area to allow glow from indicator for low battery condition.
33, 33'. Light transmission means for safety light.
40, 40'. Ambient light detector.
50, 55. On-Off-test switch.
60. Battery Carrier.
70. Alternate power source battery.
80. External electrical connections.
90. Circuit board containing the components necessary to implement the power failure backup lighting mechanism, control power monitoring and actuator circuits.
100. Low battery warning indicator.
110. Interior wall of device housing separating the low voltage circuit board and the AC voltage switch mechanism.
120. Switch contacts.
130. Outlet receptacle contacts.
140. Switch Mounting bracket.
145. Outlet Mounting bracket.
146. Mounting holes.
147. Screw
150. Electrical utility work box 160. Switch cover plate
165. Outlet cover plate

DETAILED DESCRIPTION

Turning now descriptively to the drawings, in which similar reference characters denote similar elements throughout the several views, FIGS. 1A through 3 illustrate two implementations of the concealed safety lighting device of the present invention using classic styles of switches and outlets. Obvious implementations for the concealed safety lighting device using different styles of wiring devices such as decorative or Decora are not shown as they are substantially similar in their structure and function to conceal a safety lighting device.

Figure 1B:
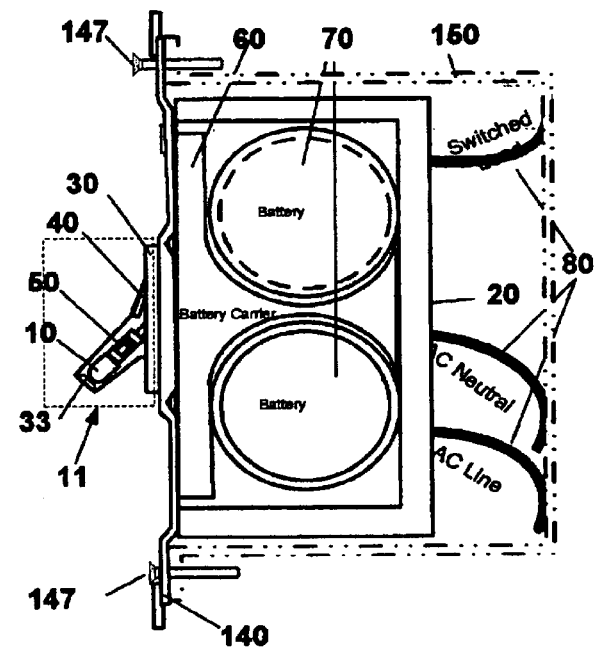
Figure 1C:
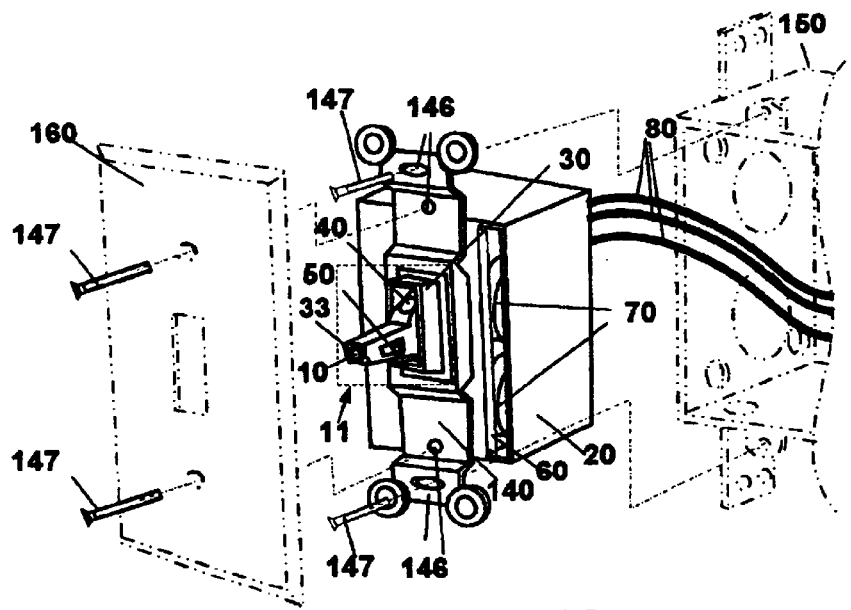
FIG. 1C shows a typical installation of the present invention in an electrical utility work box with the associated cover plate.

FIGS. 1A through 1C show the safety light source 10 embodied in the normally exposed area of the switch 11 actuator handle in such a way as to allow the light to escape from the actuator handle through the light transmission means 33 which remains visible after installing the switch cover plate 160. It also illustrates one method of installing the alternate power source battery 70 so to allow users to change them when necessary by removing the switch cover plate 160 and extracting the battery using the battery carrier 60. The ambient light detector 40 is mounted in the normally exposed area of the switch 11 such a way as to sense surrounding light levels and adjust the level of power to the safety light source 10. The switch device housing 20 is attached to switch mounting bracket 140 having all the standard structure to allow installation into a standard electrical utility work box 150 and conventional switch cover plate 160 using screws 147 into mounting holes 146. The switch otherwise appears substantially the same as a standard AC switch when the conventional switch cover plate 160 is attached thereby covering the entire device installation. The external electrical connections 80 electrically connect to the switch contacts 120 providing normal AC switch function for the concealed safety lighting device.

Figure 2A:
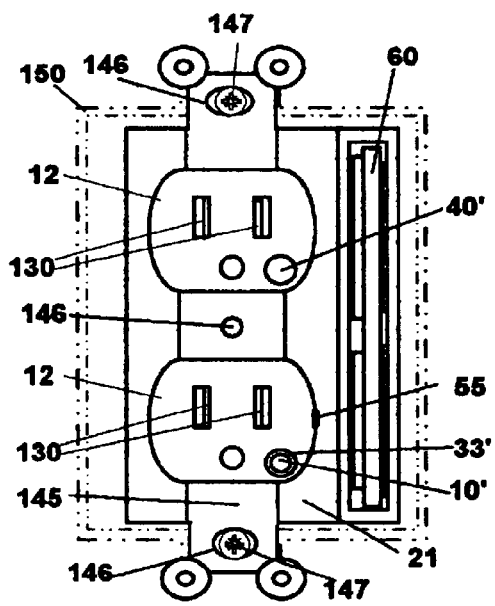
FIG. 2A is front view and FIG. 2B is a side view of the apparatus in the form of an AC power outlet for providing concealed safety lighting of the present invention.
Figure 2B:
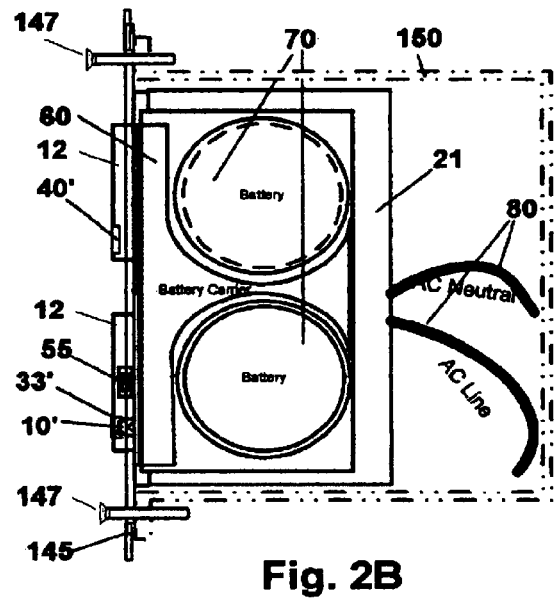
Figure 2C:
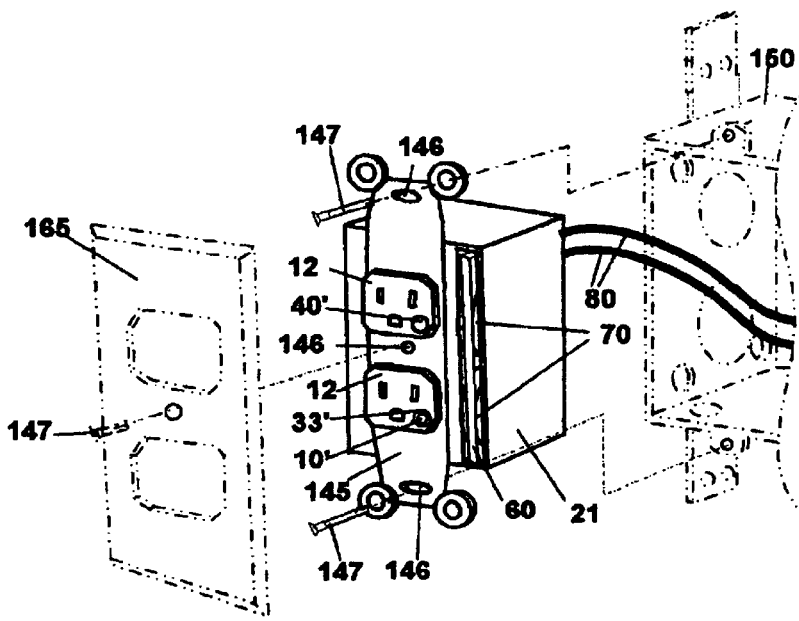
FIG. 2C shows a typical installation of the present invention in an electrical utility work box with the associated cover plate.

FIGS. 2A through 2C show the safety light source 10' embodied in the normally exposed area of the outlet 12 in such a way as to allow the light to escape through the light transmission means 33', from the outlet face and through the conventional outlet cover plate 165. The ambient light detector 40' is mounted in the normally exposed area of the outlet 12 in such a way as to sense surrounding light levels and adjust the level of power to the safety light source 10 using screws 147 into mounting holes 146. The outlet device housing 21 is attached to outlet mounting bracket 145 having all the standard structure to allow installation into a standard electrical utility work box 150 and conventional outlet cover plate 165. The external electrical connections 80 are electrically connect to the outlet receptacle contacts 130 providing normal AC power outlet function for the concealed safety lighting device.

Figure 3:
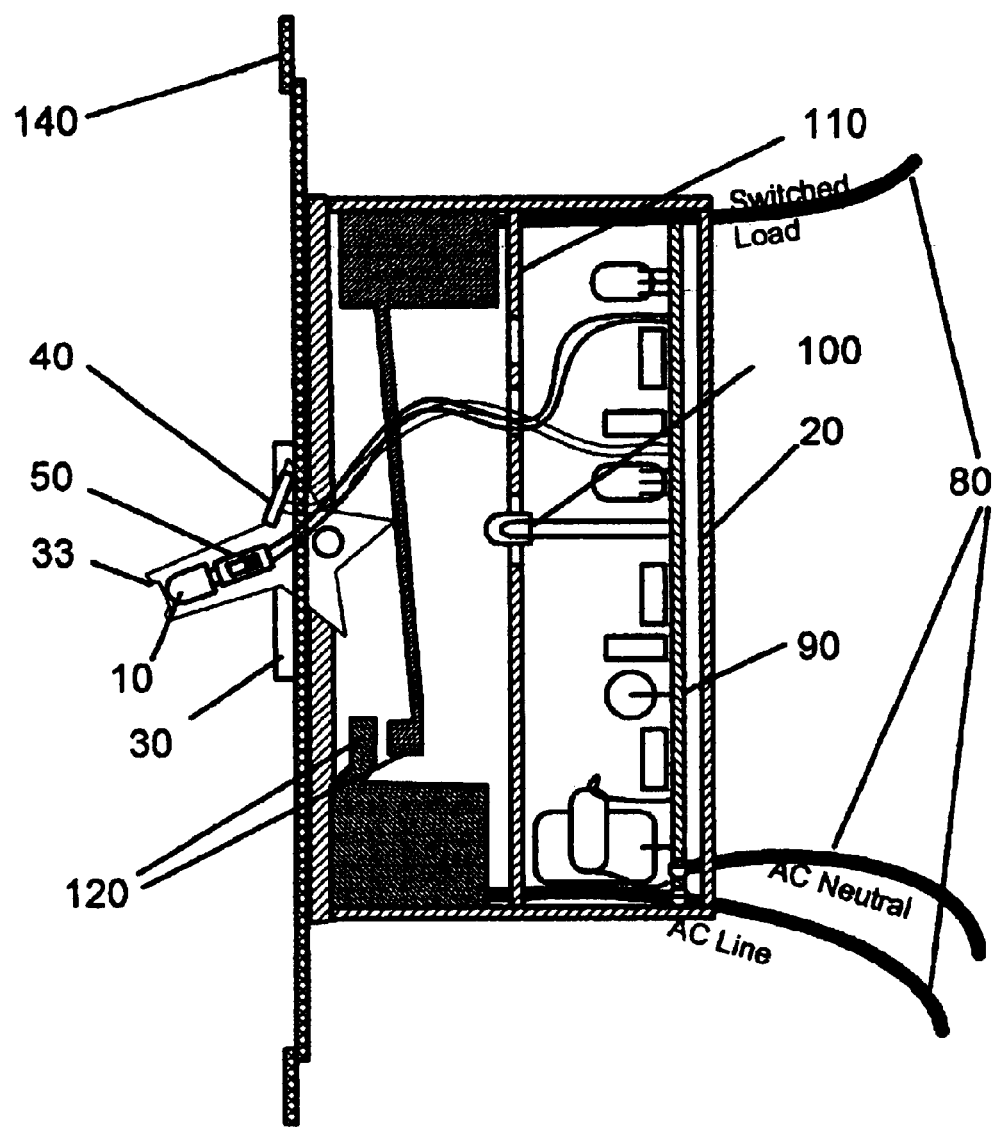

FIG. 3 shows a side cutaway view of the backup lighting mechanism in the form of a switch demonstrating one form that the body of the apparatus can take to contain all the components of the backup lighting device. The external electrical connections 80 enter the switch device housing 20 and connect to the circuit board 90 and to the switch contacts 120. Wiring from the safety light source 10 and the ambient light detector 40 is routed through the interior wall 110 and connected to the circuit board 90. Low battery warning indicator 100 is mounted in such a way as to protrude through the interior wall 110 to allow the clear or translucent body area 30 to glow and be visible to the user. Switch contacts 120 perform the same function as normal load-controlling switch contacts and are unremarkable. The switch device housing 20 is of sufficient size to contain all standard switch mechanics plus the power failure backup light mechanism herein described.

Figure 4:
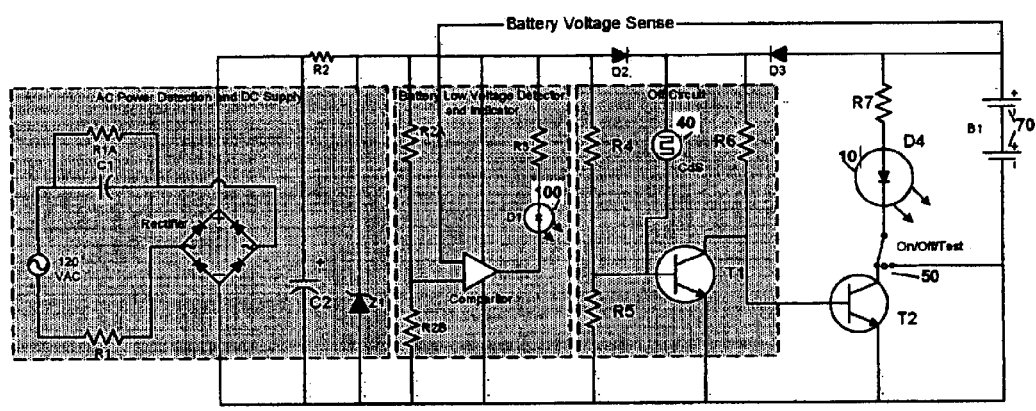
FIG. 4 is a reference design schematic diagram of a circuit of the apparatus for providing alternate safety lighting of the present invention.

Emergency Lighting and AC Detection Circuit Operation Description. The following describes one design of how the alternate safety lighting detection and actuation reference design circuitry operate to provide necessary function as described in the present invention. Referring to FIG. 4: AC Power Detection and DC Supply: This circuit represents a common transformer-less low power DC power supply design and may be implemented in other ways without impacting the scope of this present invention.

Battery Low Voltage Detector: Many devices are currently available to detect a voltage threshold and activate an indicator. This is one design to demonstrate how the present invention is able to incorporate the function. This circuit is optional and may be omitted without impacting the scope of the present invention. Diode D3 prevents charging of replaceable batteries and is replaced with a current limiting mechanism when using rechargeable batteries.

Off Circuit: In this example circuit, transistor T1 is held in the on state through resistor divider network R4 and R5 as long as AC is available. The output of T1 will keep the safety light source 10, in this reference example (LED D4), in the off state by turning off transistor T2. Current flow while AC applied is supplied through D2 through R6, through T1. In this reference example, ambient light detector 40 (CdS) has no function when AC is on since R4 will hold T1 on, T2 off and safety light source 10 LED D4 off.

When AC power is unavailable, transistor T1 will control the brightness of the safety light source 10 (LED D4) through the ambient light detector 40, (CdS) which will develop a lower resistance as more light is detected. This raises the bias voltage on the base of transistor T1 with respect to the amount of ambient light detected, thereby turning off D4 and reducing current drain on the alternate power source battery 70 (B1) to extend its useable life.

When AC power is available, transistor T1 can optionally be used to control the brightness of the safety light source 10, (LED D4) through the ambient light detector 40, CdS to provide a night light function by changing the value of the bias voltage at the base of T1 to a value that allows transistor T1 to turn off when a predetermined light level is reached.

Lighting control: The safety light source 10, in this reference example a light emitting diode, D4 will remain off while transistor T2 is off. Resistor R7 limits the amount of current through the (LED D4) and is chosen to optimize light output and battery life. The optional on-off-test switch 50 will allow the safety light source 10 (LED D4) to be deactivated if not needed during AC power failure conditions. The low voltage detector circuit is designed into the circuit in such a way as to trigger the low battery warning indicator 100 (D1) when AC power is present and the battery voltage falls below a certain voltage determined by the resistor divider R2A and R2B.

The above circuit description is a reference design to indicate how one implementation can provide the necessary feature and function of the described present invention.

From the above description it can be seen that the concealed safety lighting device for providing alternate safety lighting of the present invention can be constructed in a small enough form factor to integrate the light source and the backup safety light mechanism into standard AC electrical switches and outlets to overcome the shortcomings of prior art devices. It describes a concealed safety lighting device that provides backup safety lighting in a concealed or inconspicuous way which is able to detect the occurrence of a power failure and provide backup safety lighting upon detection of the power failure. The backup safety light mechanism includes an alternate power source which can take the form of, but not limited to non-rechargeable batteries or rechargeable batteries with sufficient power density to provide a useful lighting period during utility supplied AC power failures. The backup safety light mechanism also includes an ambient light detector for extending the life of the batteries, and an optional on/off switch for selectively turning the emergency light off during a power outage.

Furthermore, the concealed safety lighting device of the present invention is simple and easy to install, use, and is economical to manufacture. It will be understood that each of the elements described above, or two or more together may also find a useful application in other types of methods differing from the type described above.

While certain novel features of this invention have been shown and described using exemplary preferred embodiments, the scope of the invention is not intended to be limited to the details above, since it will be understood that various omissions, modifications, substitutions and changes in the forms and details of the device illustrated and in its operation can be made by those skilled in the art without departing in any way from the spirit of the present invention. Therefore, the scope of the claims should be accorded the broadest interpretation so as to encompass all such modifications and similar arrangements.

What is claimed is:

1. A concealed safety lighting device comprising:
    a) an electrical wiring device selected from the group consisting of a switch and electric power outlet, having a housing adapted to fit within an electrical utility work box, said electrical wiring device further comprising a mounting means to be supported;
    b) a light source adapted to emit light through a surface area of said electrical wiring device, said surface area visibly exposed through a void in a conventional wall cover plate;
    c) a power sensing and control means connected to said light source to provide a signal to control the on-off state of said light source;
whereby said concealed safety lighting device has an exterior appearance that visibly resembles a conventional electrical switch or power outlet when installed and covered by said conventional wall cover plate.

2. The concealed safety lighting device of claim 1 wherein said power sensing and control means comprises a power failure backup lighting mechanism further comprising an alternate power source, a power failure detection means and an actuator means arranged to provide a power signal to said light source in response to a power failure.

3. The concealed safety lighting device of claim 1, wherein said light source is controlled by a light detection means arranged to detect levels of ambient light in the area adjacent to said safety lighting device, said light detection means connected to said power sensing and control mechanism for causing it to alter the amount of power applied to said light source.

4. The concealed safety lighting device as in claim 1, wherein said common electrical wiring device further comprises a transmission means for said light source, said transmission means arranged to convey light through said surface area of said electrical wiring device that is visibly exposed through said void in said cover plate; whereby said light source illuminates the area adjacent to said safety lighting device by emitting light through said transmission means.

5. The concealed safety lighting device of claim 4, wherein said transmission means is selected from the group consisting of a void, lens, transparent material, translucent material, light pipe, and fiber optic material.

6. A concealed safety lighting device comprising:
    a) a housing for replacement of an electric wiring device selected from the group consisting of a switch and power outlet, said housing further comprising a mounting means adapted to affix said housing to an electrical utility work box, said mounting means further comprising a means to affix a conventional cover plate for said electric wiring device;
    b) a light source adapted such that the light emitted from said light source is transmitted through a visible surface area of said housing as a means to illuminate the area adjacent to said safety lighting device, said visible surface area protruding into, and exposed through, a void in said conventional cover plate;
    c) a power-sensing signal means controlling the on-off state of said light source, said power-sensing signal means providing an electrical power signal to energize said light source;
whereby said safety lighting device replaces conventional switch or power outlet devices effectively concealing said safety lighting device when covered by a conventional wall cover plate.

7. The concealed safety lighting device of claim 6, wherein said power-sensing signal means further comprises:
    a) a power failure detection means, connected to a primary power supply, arranged to provide detection and signaling of a power failure of said primary power supply;
    b) a connection means adapted to provide an electrical connection to an alternate power source, said alternate power source comprised of a battery;
    c) an actuator means arranged to electrically switch the power source for said light source to said connection means when activated by said power failure detection means;
whereby said power-sensing signal means provides an electrical power signal to said light source to emit light during a power failure, thereby causing said concealed safety lighting device to perform as an emergency backup lighting device.

8. The concealed safety lighting device of claim 6, wherein said power-sensing signal means further comprises a light detection means adapted to monitor ambient lighting conditions, wherein said light detection means is arranged to reduce or increase power to said light source in response to changes in ambient light levels.

9. The concealed safety lighting device of claim 6, wherein said housing further comprises mechanical and electrical components of said electrical wiring device, whereby said safety lighting device illuminates a darkened room area while simultaneously providing the function of said electrical wiring device.

10. The concealed safety lighting device of claim 6 wherein said housing further comprises a compartment to contain an alternate power source, said alternate power source capable of providing low voltage direct current.

11. The concealed safety lighting device of claim 6 wherein said visible surface area further comprises:
    a) a switch actuator mechanism from the group consisting of a lever, slide, toggle, bat, rocker and pushbutton; or b) a power outlet for receiving an electrical plug; or c) a bezel used to frame or support said switch actuator mechanism or power outlet;

d) a non-functional form factor having no other purpose than to convey light from said light source through said standard cover plate.

12. The concealed safety lighting device of claim 6 wherein said housing further comprises a fight transmission means for said light source, said light transmission means arranged to convey light from said light source through said visible surface area of said safety lighting device exposed through a void in said cover plate.

13. The concealed safety lighting device of claim 12 wherein said light transmission means is selected from the group consisting of a void, lens, transparent material, translucent material light pipe, and fiber optic material.

14. A method of providing safety lighting without indicating that an area is so equipped by concealing a safety lighting device in said area, wherein the step of concealing said safety lighting device is comprised of:

a) combining a light source with a conventional electrical wiring device selected from the group consisting of a switch and power outlet;

b) controlling the on-off state of said light source using an electronic signal;

c) conveying light from said light source through a visible surface area of said conventional electrical wiring device utilizing a light transmission means to expose light emitted from said light source, said light transmission means selected from the group consisting of a void, lens, transparent material, translucent material light pipe, and fiber optic material;

whereby said safety lighting device is installed in an electrical utility work box and concealed behind a standard wall cover plate.

15. The method of claim 14 wherein the step of controlling the on-off state of said light source includes the step of providing a concealed night light function further comprising the steps of:

a) monitoring ambient light conditions in the area adjacent to said safety lighting device;

b) using primary power to supply power to said light source;

c) increasing power to said light source when predetermined low light levels exist in said area adjacent to said safety lighting;

d) reducing power to said light source when predetermined light levels exist in said area adjacent to said safety lighting;

thereby providing illumination during hours of darkness while primary power is available.

16. A method of claim 14, wherein the step of controlling the on-off state of said light source further comprises the steps of:

a) sensing primary power using said power-sensing signal circuit connected to a primary power source, thereby detecting the occurrence of a power failure;

b) electrically connecting said light source to an alternate power source when power failure is detected;

thereby controlling said light source in said conventional electric wiring device upon detection of power failure.

17. The method of claim 16 wherein the step of controlling the on-off state of said light source further includes the step of automatically conserving power of said alternate power source further comprising the steps of:

a) monitoring ambient light conditions in the area adjacent to said safety lighting device;

b) increasing power to said light source to provide backup lighting at a predetermined low light level;

c) reducing power to said light source when predetermined light levels exist in said surrounding area;

thereby reducing said alternate power source energy consumption and extending the duration of operation during the failure of said primary power source.

* * * * *